United States Patent [19]

Skinner

[11] Patent Number: 5,642,891
[45] Date of Patent: Jul. 1, 1997

[54] RADIALLY EXPANDABLE LOCKING DEVICE FOR A PIPE SEAL

[76] Inventor: William O. Skinner, 5520 S. Bend Dr., Fort Wayne, Ind. 46804

[21] Appl. No.: 665,826

[22] Filed: Jun. 19, 1996

Related U.S. Application Data

[60] Provisional application No. 60/000, 303, Jun. 19, 1996.

[51] Int. Cl.$^6$ ............................. F16J 15/00; B65D 63/02
[52] U.S. Cl. ..................... 277/101; 277/128; 277/147; 277/189; 24/20 CW
[58] Field of Search ..................... 277/101, 147, 277/156, 128, 189, 212 FB; 24/20 CW, 271; 285/109, 162, 194, 236

[56] References Cited

U.S. PATENT DOCUMENTS

| | | |
|---|---|---|
| 3,958,313 | 5/1976 | Rossborough . |
| 4,191,390 | 3/1980 | Wolf et al. ............................. 277/101 |
| 4,215,868 | 8/1980 | Skinner et al. . |
| 4,478,437 | 10/1984 | Skinner . |
| 4,711,455 | 12/1987 | Ditcher et al. . |
| 4,903,970 | 2/1990 | Ditcher et al. . |
| 5,029,907 | 7/1991 | Gundy . |
| 5,054,794 | 10/1991 | Westhoff et al. ........................ 277/101 |
| 5,150,927 | 9/1992 | Skinner . |

OTHER PUBLICATIONS

"Press–Boot" by: Press–Seal Gasket Corporation (no date available).

*Primary Examiner*—Daniel G. DePumpo
*Attorney, Agent, or Firm*—John R. Benefiel

[57] ABSTRACT

A radially expandable device for exerting an outward expansion of a seal to establish a pipe joint including a band having inner and outer ends wrapped to overlap. A pivot link hinged to the inner band end has serrations which engage locking serrations on the inside of the outer band end and swings out as the band inner end is forced out with a hydraulic jack to an expanded locked condition, in which the pivot link extends circumferentially. The radial expansion is accomplished with lower friction as the frictional resistance created by contact with seal is reduced, and simplified installation equipment may be used.

5 Claims, 2 Drawing Sheets

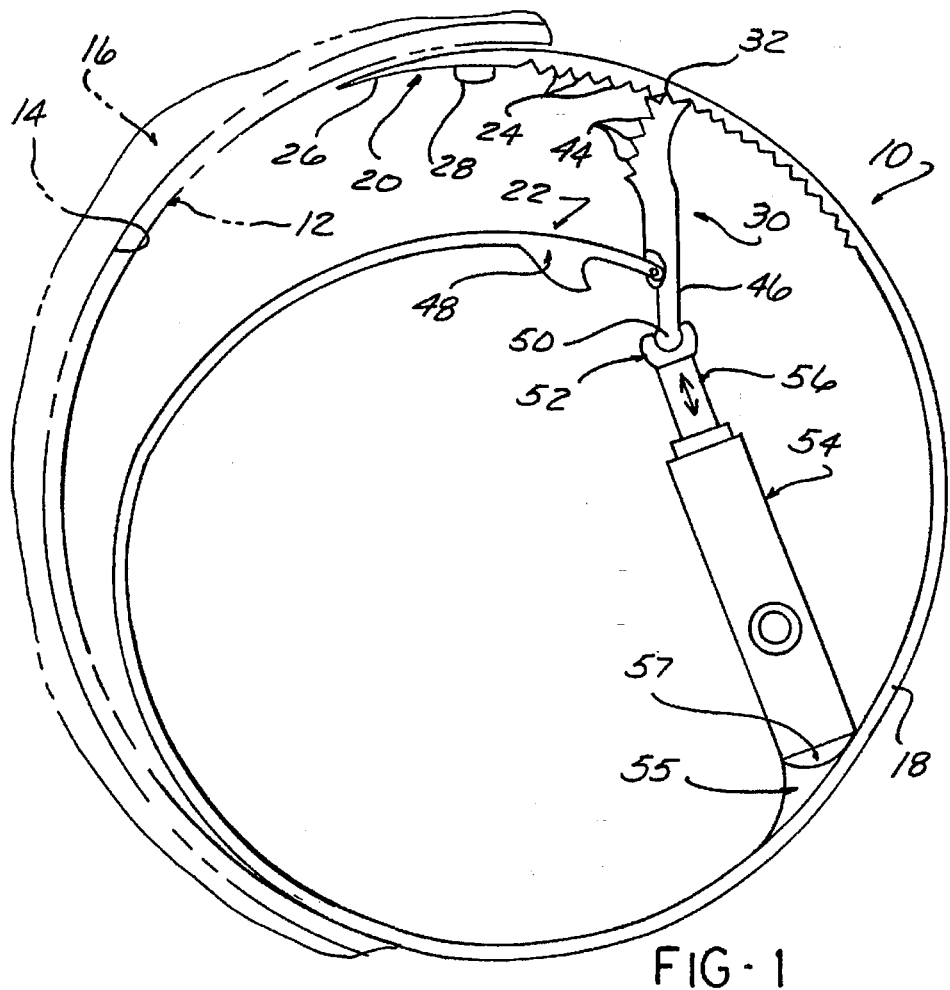
FIG·1
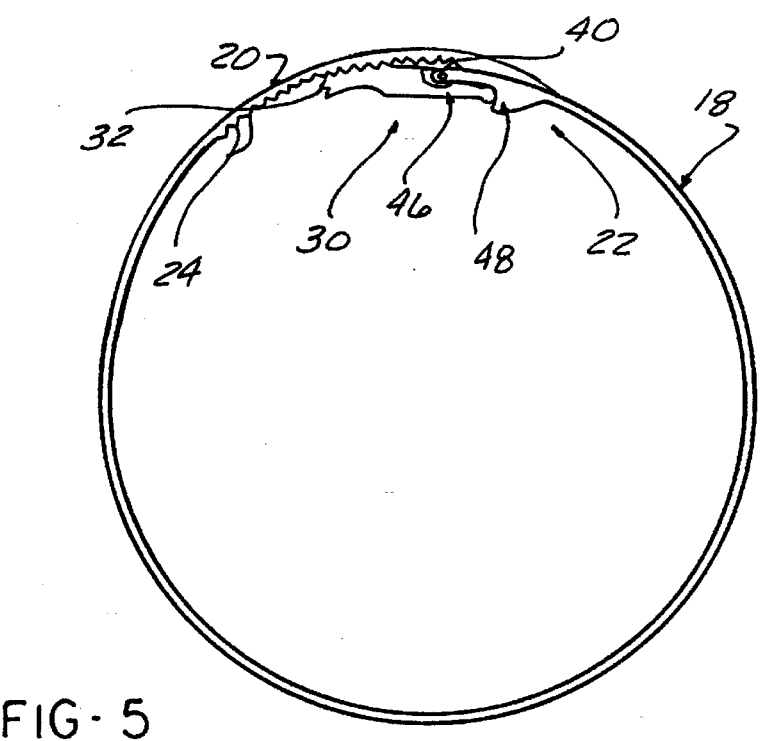
FIG·5

RADIALLY EXPANDABLE LOCKING DEVICE FOR A PIPE SEAL

CROSS REFERENCE TO RELATED APPLICATION

This application is a based on provisional application U.S. Ser. No. 60/000,303, filed on Jun. 19, 1995.

BACKGROUND OF THE INVENTION

This invention concerns devices for expanding radial seals to establish compression of the seal against the wall of a surrounding bore. A common use for such devices is with pipe to manhole seals of a type described in U.S. Pat. No. 4,478,437 by the present inventor issued on Oct. 23, 1984 for a "Radially Expandable Locking Sleeve Device" in which an elastomeric sleeve is clamped at one end to the pipe and is expanded outwardly at the other end to create a fluid tight seal against a hole in a manhole structure.

U.S. Pat. No. 5,150,927 by the present inventor issued on Sep. 29, 1992 describes a toothed end split band which is expanded with a special hinged tool, a toothed locking portion holding the band ends in their expanded condition.

A 1995 product brochure for a PRESS-BOOT™ of the Press-Seal Gasket Corporation describes a more refined version of this design.

See also U.S. Pat. No. 4,215,868 by the present inventor and U.S. Pat. No. 4,711,455 to Ditcher.

In these patents, the split expansion band is expanded by almost purely circumferential motion in spreading the ends with a hydraulically-operated expander. Friction between the band and the seal becomes very great due to the purely circumferential sliding motion taking place, particularly as the radial forces increase.

In most of these designs, the teeth are ratcheted apart as band expansion takes place. As the friction forces increase as described, the locking teeth may be deformed and fail.

U.S. Pat. No. 3,958,313 issued on May 25, 1976 for a "Method, Apparatus and Product for Improved Pipe to Manhole Sealing" describes an expandable metal band having toggle sections which are moved overcenter by a conventional hydraulic jack. While this approach does not require special expanding devices, the toggle sections may move too far overcenter. This creates a peaked condition which may lead to gaps on either side creating leaks past the seal.

Some of the other expanding sleeve designs described above also create discontinuities on their perimeters affecting sealing.

It is the object of the present invention to provide an expansion band configuration which reduces frictional loads and does not require specialized equipment for installation and which insures an effective seal around the seal perimeter.

SUMMARY OF THE INVENTION

The above object is achieved by an expansion band which is wrapped to overlap its ends, with an inner end of the band having mounted to it a separate pivotally connected link. The pivotal link has serrations on the outside located to mate with locking serrations on the inside surface of the outer end of the band.

The pivotal link is initially oriented to extend generally radially, with a ridge at the end of the link inserted in a serration on the outer band end. In this position, the inner band end is drawn radially inward to be readily positioned within the seal.

A tail section integral with the pivot lock extends beneath the inner band end and is adapted to be engaged with a hydraulic jack.

The pivotal link is forced to pivot outwardly moving into alignment with the inner band end so that the serrations formed thereon move into mating locking engagement with the serrations on the other band end. The band thus is caused to expand by means of a substantial radial movement of the inner band end and adjacent band segment to reduce friction with the seal as expansion takes place.

The pivotal link limits movement of the pivot joint to prevent excessive overcenter movement of the liner. A lug formed on the inside of the inner band end engages the end of the tail section and partially absorbs the end thrust of the pivot link in being compressed by the expanded seal.

A simple linear jacking device can be employed, acting to force the link to pivot in installing the band to reduce the cost of installation equipment.

DESCRIPTION OF THE DRAWINGS

FIG. 1 is a fragmentary transverse sectional view taken through a radial seal and hole structure, with an end view of an expandable band device positioned within the seal in the contracted state for installation of the seal using a hydraulic jack.

FIG. 5 is a view of the expandable band device illustrated in FIG. 1, but in the expanded condition.

DETAILED DESCRIPTION

Figure 2:
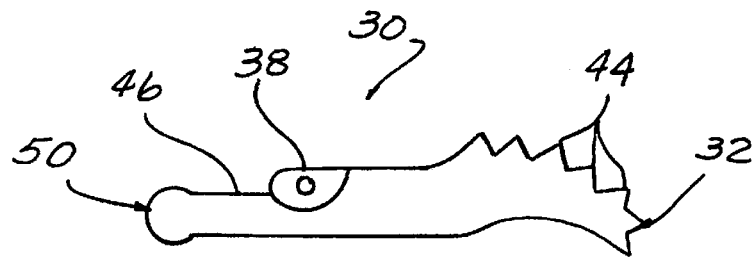
FIG. 2 is a side view of a pivoted locking link included in the expandable band device shown in FIG. 1.
Figure 3:
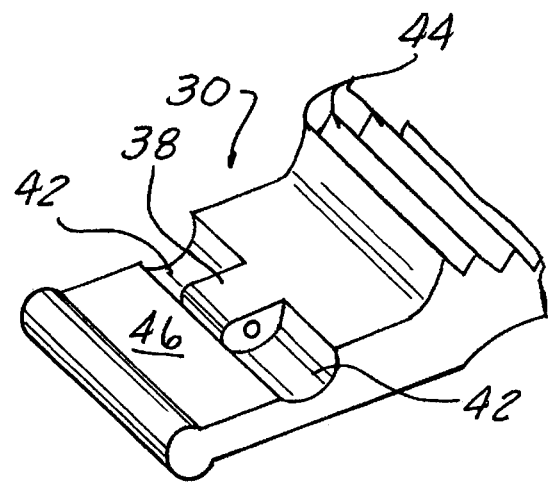
FIG. 3 is a plan view of the pivot link and a fragmentary portion of the inner band end connected to the pivot link.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, the expandable band device 10 according to the present invention is used to expand a section of an annular elastomeric seal 12 (shown in phantom) which is to be expanded against the perimeter 14 of a bore in a structure 16 such as a concrete manhole. Since the above-cited references provide detailed descriptions of typical seal installations with which the device according to the present invention is usable and are well known in the art, such details are not here set out.

The expandable band device 10 comprises a band 18 constructed of a molded strong plastic such as filled nylon of a width on the order of one and a half inches. The band 18 is wrapped so that an outer band end 20 overlaps an inner band end 22. The construction of the band 18 itself may be similar to the band shown in the Press-Seal Corporation catalog referenced above.

The outer band end 20 has a series of locking teeth or serrations 24 formed on its inner surface facing the outer surface of the overlapped inner end 22. The terminal end portion 26 of the outer band end 20 is tapered as shown to provide a smooth transition when the outer band end 20 is wrapped tightly over the inner band 22 when the seal 12 is expanded. This eliminates a sharp corner which could create uneven sealing pressure and result in leaks.

A pair of integral tabs 28, each on a respective side, acts to guide the inner band end 22 to insure that it is accurately overlain by the outer band end 20 when expanded.

The inner band end 22 has a pivot link 30 pivotally connected to its end, the pivot link 30 being of the same width as the band 18 itself.

The pivot link 30 may be of molded construction similar to the band 18, or may be manufactured from metal for higher strength.

The pivotal link 30 has an end ridge 32 which is initially seated in a space between two of the serrations 24 formed on the inside of the outer band end 20. This space is selected to create the correct expansion depending on the exact hole size as the final expanded diameter will be determined by the initial position of the pivotal lock. A series of numbers can be marked on the band side adjacent the serrations 24 which can be matched to a chart of corresponding hole diameters. By measuring the size of the hole in which the seal is to be installed, the installer can select the correct initial set-up of the pivotal link 30.

In the initial condition shown, the pivot link 30 extends generally radially, transversely to the inner band end 22.

Figure 4:
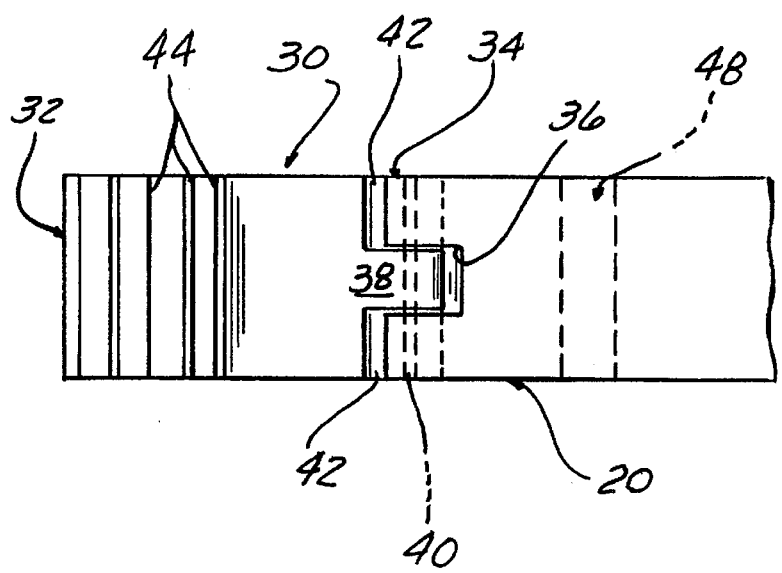
FIG. 4 is an enlarged perspective reverse view of a portion of the pivot link.

The pivot mounting may comprise a clevis 34 (FIG. 4) molded into the inner band end 22 defining a space 36 into which is received a tongue feature 38, with a metal pin 40 extending through aligned holes to establish a hinging axis.

Clearance spaces 42 are molded adjacent the tongue 38 to allow free pivoting movement of the clevis ends without interference.

The resilience of the sections of the band 18 adjacent the inner band end 22 and the position of the pivot link 30 with the ridge 32 anchored in serrations 24 creates a sort of toggle action which resilience urges retraction of the toggle. The end of the clevis space 34 is located to engage tongue 30 so as to limit retraction to the degree shown in FIG. 1.

The pivot link 30 is itself formed with teeth or serrations 44 on a side facing back towards the inner band end 22 when in the initial position, configured to interfit and lock to the serrations 24 on the inside of the outer band end 20 when the device is expanded, as will be described.

A tail extension 46 is integral with the pivot link 30, extending past the hinging axis and below the tongue 38.

This configuration allows the extension to move against the inside surface of the inner band end 22 when the pivot link 30 hinges to extend substantially circumferentially in the fully installed condition, as will be described in reference to FIG. 5.

A lug 48 is molded projecting from the inside of the inner band end 22 configured to abut the end 50 of the tail extension 46 when the expanding step is completed.

The tail extension end 50 may be rounded to be partially cylindrical to be fit to a concavely shaped end piece 52 of the actuator shaft 56 of the hydraulic jack 54.

The jack 54 is positioned within the band 18. A rounded adaptor end piece 57 may be seated in a curved anchoring seat 55 molded into the inside of the band 18.

This arrangement accommodates the slight arcing of the tail extension as the inner band end 22 and pivot link 30 are forced out by operation of the jack 54.

It can be seen in FIG. 1 that a major proportion of the band 18 is out of engagement with the seal 12 as radial expansion takes place by outward toggling of the band end 22 and the pivot link 30 by extension of the jack actuator shaft 54.

This greatly reduces the frictional resistance to radial expansion.

As the pivot link 30 swings out, serrations 44 engage serrations 24 adjacent the space whereat the ridge is engaged.

The pivot link 30 eventually reaches a slightly overcenter condition as it rotates to be extended circumferentially.

The force exerted by the stretched radial seal 12 maintains the pivot link in this locked condition in which the perimeter defined by the band 18 is expanded to force the seal 12 against the surface 14.

The tail extension 46 moves against the inside surface of the inner band end 22, limiting this overcenter movement.

The lug 48 absorbs the end thrust exerted by the seal force insuring that these considerable forces are easily withstood by the devices.

The outer contour of the expanded band 18 is smooth by virtue of the overlapped condition of the wrapped band ends 20, 22.

Any tendency for peaking by excessive overtravel of the toggle link components is avoided.

A conventional jack 54 can be used, although simple adapter pieces 55, 57 may be advantageous.

I claim:

1. A radial expansion device comprising:

a band wrapped to have respective ends formed to overlap with each other, an outer end having a series of serrations formed along the length of an inside surface thereof;

a band link pivotally connected to the other end lying within said outer end;

said band link having a series of serrations on one side thereof configured to mate with said serrations on the inside of said outer end, said band link further formed with an end feature adapted to be received in one of said outer end serrations with said link pivoted on said band inner end to extend in a radial direction at an angle to said band inner end, said link pivoting to bring said serrations thereon into mating engagement with said band outer end serrations as said link is pivoted to extend circumferentially causing spreading of said band ends by a toggle effect between said link and said band outer end.

2. The device according to claim 1 wherein said link is formed with a tail extension extending radially inward from said band inner end, said tail extension swinging to extend circumferentially along an inside surface of said band inner end as said link is extended circumferentially.

3. The device according to claim 2 wherein said band inside surface is formed with a lug against which an end of said tail extension abuts when said link pivots to extend substantially circumferentially.

4. The device according to claim 2 wherein said pivot link is of substantially the same width as said wrapped band.

5. The device according to claim 2 wherein said tail extension is offset below said pivotal connection.

\* \* \* \* \*